United States Patent
Halim et al.

(10) Patent No.: US 7,792,951 B2
(45) Date of Patent: Sep. 7, 2010

(54) APPARATUS AND METHODS FOR CLASSIFICATION OF WEB SITES

(75) Inventors: Nagui Halim, Yorktown Heights, NY (US); Zhen Liu, Tarrytown, NY (US); Mark Steven Squillante, Pound Ridge, NY (US); Honghui Xia, Croton on Hudson, NY (US); Shun-Zheng Yu, Guangdong (CN); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 2328 days.

(21) Appl. No.: 10/315,705

(22) Filed: Dec. 10, 2002

(65) Prior Publication Data
US 2004/0111504 A1  Jun. 10, 2004

(51) Int. Cl.
*G06F 15/173* (2006.01)
(52) U.S. Cl. ................................ 709/224; 709/223
(58) Field of Classification Search .......... 709/223–226
See application file for complete search history.

(56) References Cited

U.S. PATENT DOCUMENTS

| | | | |
|---|---|---|---|
| 6,119,143 A | 9/2000 | Dias et al. | |
| 6,185,601 B1 | 2/2001 | Wolff | |
| 6,253,230 B1 | 6/2001 | Couland et al. | |
| 6,263,361 B1 * | 7/2001 | Hoyer et al. | 709/203 |
| 6,311,219 B1 | 10/2001 | Factor | |
| 6,374,297 B1 | 4/2002 | Wolf et al. | |
| 6,502,131 B1 * | 12/2002 | Vaid et al. | 709/224 |
| 6,662,227 B2 * | 12/2003 | Boyd et al. | 709/224 |
| 6,728,748 B1 * | 4/2004 | Mangipudi et al. | 718/105 |

(Continued)

OTHER PUBLICATIONS

StatSoft (Oct. 17, 2000). Cluster Analysis. Retrieved Apr. 3, 2006 from Web site: http://web.archive.org/web/20001017022353/http://www.statsoft.com/textbook/stcluan.html.*

*Primary Examiner*—Shawki S Ismail
(74) *Attorney, Agent, or Firm*—Yee & Associates, P.C.; Mark Wardas

(57) ABSTRACT

Apparatus and methods for classifying web sites are provided. With the apparatus and methods, traffic data is obtained for a plurality of web sites. This patterns, or templates, for each web site are generated based on this traffic data and the patterns are clustered into classes of web sites using a clustering algorithm. The clusters, or classes, are then profiled to generate a template for each class. The template for each class is generated by first shifting the patterns for each web site that is part of the class to compensate for effects like time zone differences, if any, and then identifying a pattern that is most similar to all of the patterns in the class. Once the template for each class is generated, this template is then used with traffic data from a new web site to classify the new web site into one of the existing classes. In other words, when traffic data for a new web site is received, a pattern for the traffic data of the new web site is generated and compared to the templates for the various classes. If a matching class template is identified, the new web site is classified into the corresponding class. If the pattern for the new web site does not match any of the existing templates, a new template and class may be generated based on the pattern for the new web site.

38 Claims, 14 Drawing Sheets

U.S. PATENT DOCUMENTS

| | | | |
|---|---|---|---|
| 6,766,370 B2 * | 7/2004 | Glommen et al. | 709/224 |
| 6,778,991 B2 * | 8/2004 | Tenorio | 707/10 |
| 6,801,945 B2 * | 10/2004 | Lin et al. | 709/229 |
| 6,947,985 B2 * | 9/2005 | Hegli et al. | 709/224 |
| 7,386,611 B2 * | 6/2008 | Dias et al. | 709/224 |
| 2002/1014394 | 10/2002 | Shahabuddin et al. | |
| 2003/0200175 A1 * | 10/2003 | Wang et al. | 705/50 |
| 2007/0124461 A1 * | 5/2007 | Kryskow et al. | 709/224 |

* cited by examiner

APPARATUS AND METHODS FOR CLASSIFICATION OF WEB SITES

BACKGROUND OF THE INVENTION

1. Technical Field

The present invention is directed to apparatus and methods for classifying web sites. More specifically, the present invention is directed to apparatus and methods for profiling web sites, clustering web sites, and classifying web sites based on the profiling and clustering.

2. Description of Related Art

The problems of workload characterization, performance modeling, workload and performance forecasting, and capacity planning are fundamental to growth of web services and applications. That is, the ability to characterize the workload that is experienced by a web server is crucial to devising ways to handle the workload. Typically, such workload characterization has been "after the fact" in that it is performed as a mechanism for determining how to compensate for workload already experienced. Thus, the known mechanisms for workload characterization is limited to the workload previously experienced by a particular web server.

Such workload characterization focuses on the complexity of web traffic at the level of object-hits or page-views. Such characterization does not take into account higher-level characteristics such as the traffic that a web site experiences over a period of time. Moreover such characterization does not take into account the similarity of traffic patterns experienced by a plurality of web sites. As a result, the characterization of the known systems does not provide insight into the traffic that a web site is likely to experience in the future or mechanisms for handling such traffic as determined by the similarities with other web sites.

Thus, it would be beneficial to have an improved apparatus and method for classifying web sites based on their traffic patterns and similarities with other web site traffic patterns.

SUMMARY OF THE INVENTION

The present invention provides apparatus and methods for classifying web sites. With the apparatus and methods of the present invention, traffic data is obtained for a plurality of web sites. Patterns, or templates, for each web site are generated based on this traffic data and the patterns are clustered into classes of web sites using a clustering algorithm. The clusters, or classes, are then profiled to generate a template for each class. The template for each class is generated by first shifting the patterns for each web site that is part of the class to compensate for effects like time zone differences, if any, and then identifying a pattern that is most similar to all of the patterns in the class.

Once the template for each class is generated, this template is then used with traffic data from a new web site to classify the new web site into one of the existing classes. In other words, when traffic data for a new web site is received, a pattern for the traffic data of the new web site is generated and compared to the templates for the various classes. If a matching class template is identified, the new web site is classified into the corresponding class. If the pattern for the new web site does not match any of the existing templates, a new template and class may be generated based on the pattern for the new web site.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The preferred embodiments of the present invention are implemented in a distributed data processing environment in which traffic data is compiled and used to profile, cluster and categorize web sites. Since the present invention is implemented in a distributed data processing environment, a brief description of this environment will first be provided in order to provide a context in which the present invention operates.

Figure 1:
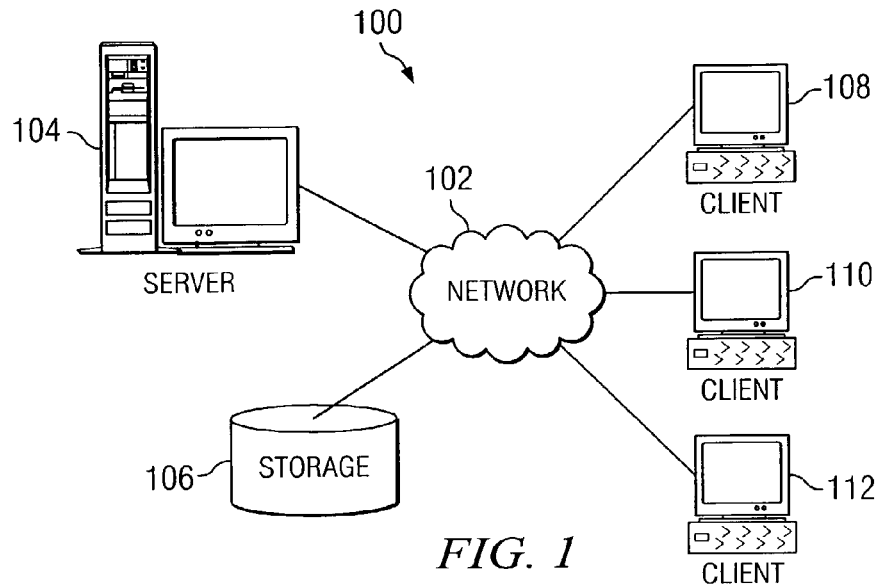
FIG. 1 is an exemplary diagram of a distributed data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
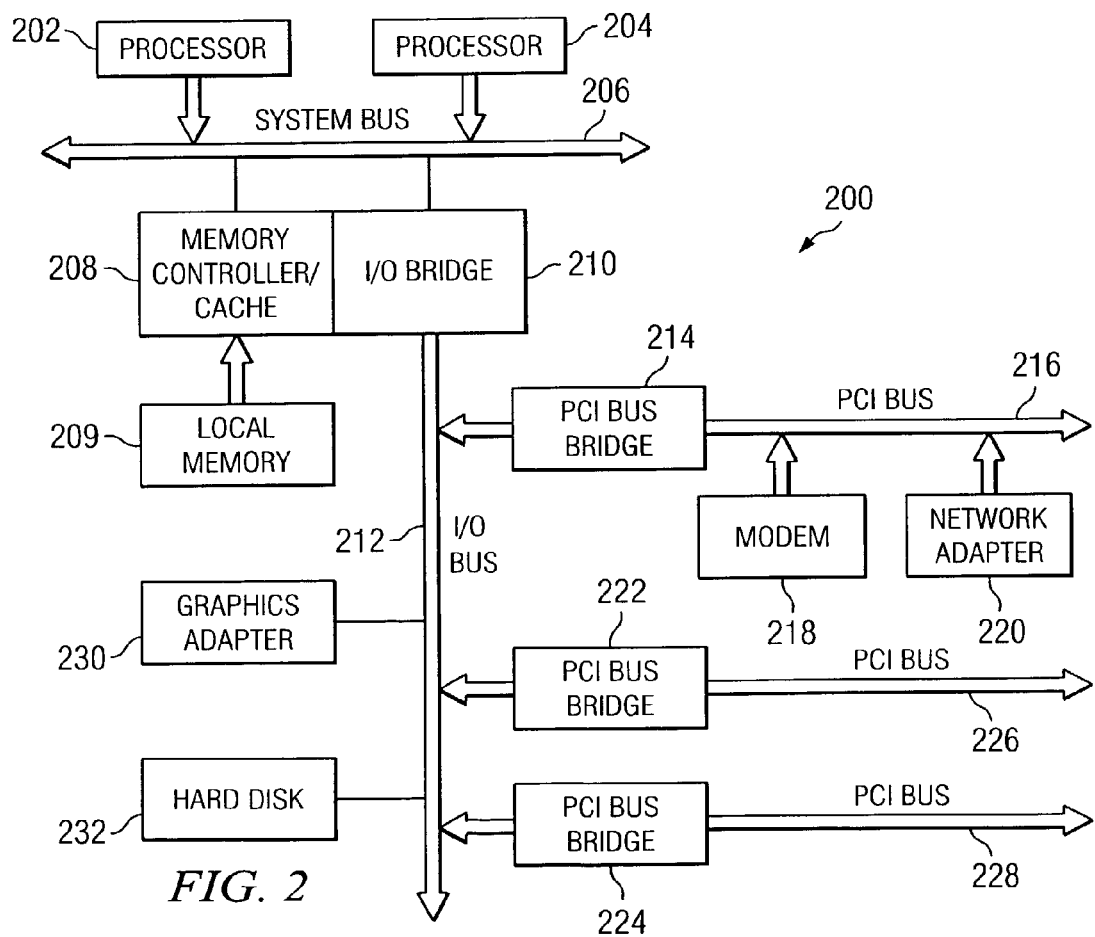
FIG. 2 is an exemplary block diagram of a server computing device according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
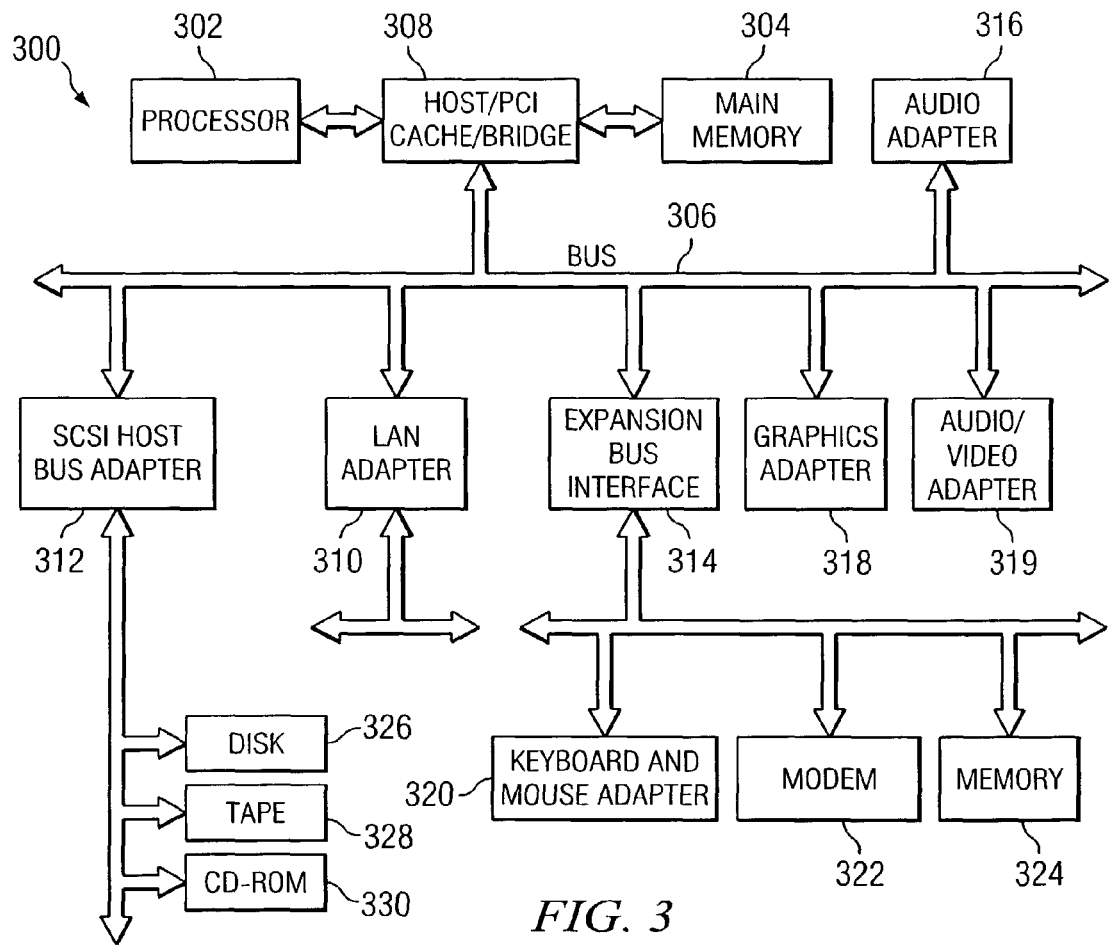
FIG. 3 is an exemplary block diagram of a client computing device according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used.

Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

As mentioned previously, the present invention provides a mechanism for categorizing web sites. Such categorization is a support functionality for use in workload characterization, performance modeling, workload and performance forecasting, capacity planning, and the like. Basically, each of these various functions are directed to optimizing resource utilization and making sure that there are enough resources available to handle the traffic experienced by the web site in order to give a determined level of service to client devices. Web site categorization according to the present invention may be a principle support function for ensuring accurate modeling of the web site for use in these other functions.

A fundamental part of the present invention is the discovery that web sites have repeated patterns of traffic characteristics that may be exploited to help solve the problems of workload characterization, performance modeling, workload and performance forecasting, and capacity planning. These patterns may exist for various different measures including number of hits, bytes, page views, visits, hits per visit, page views per visit, seconds per page view, seconds per visit, and the like. Moreover, these patterns may exist for various time scales including monthly, weekly, daily, hourly, and the like. To illustrate the repeated patterns of traffic characteristics, the number of hits per hour over a week time interval for a plurality of exemplary commercial web sites will be considered.

Figure 4A:
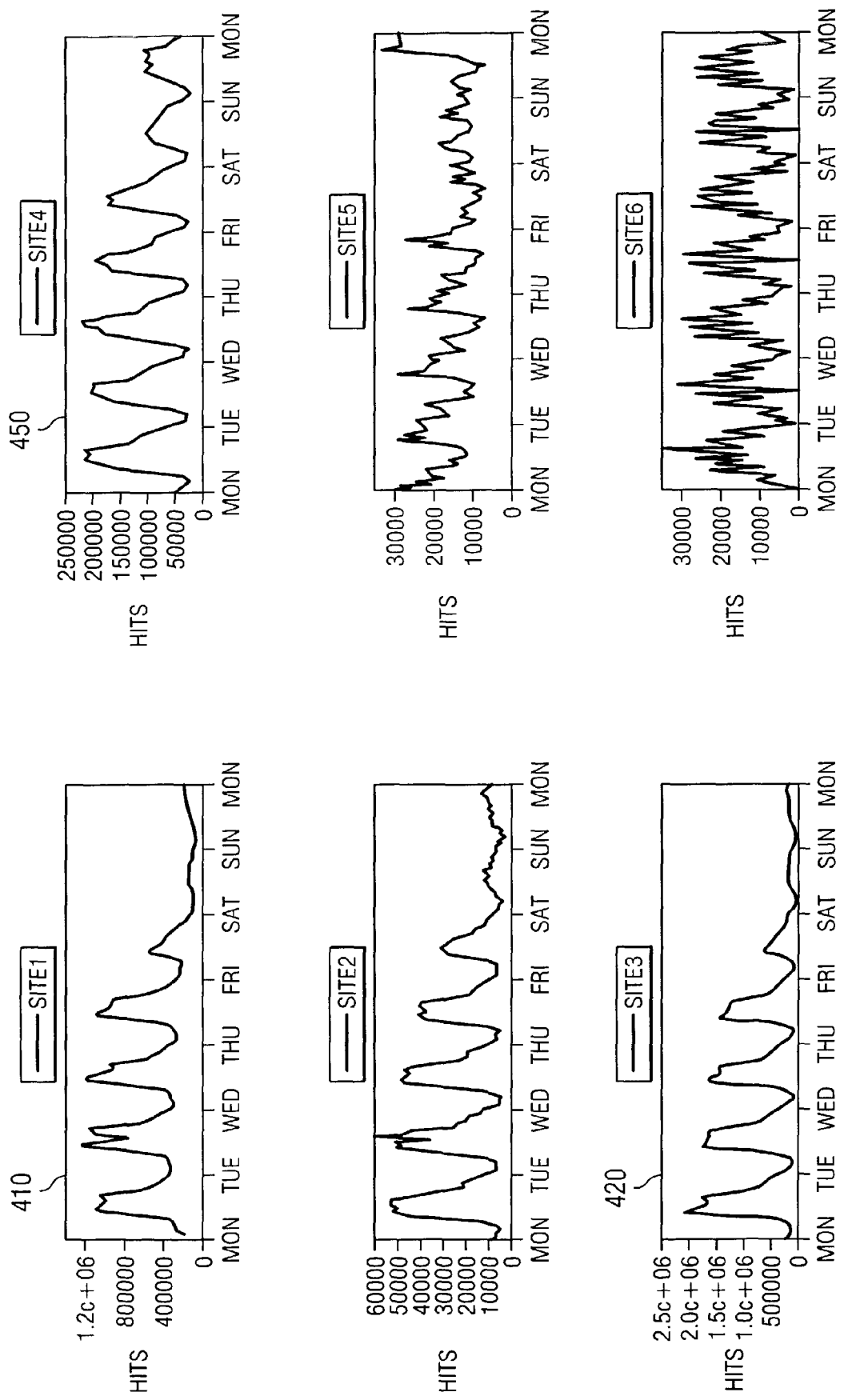
FIGS. 4A-4C are exemplary diagrams of hourly hits over a period of one week for exemplary commercial web sites.
Figure 4B:
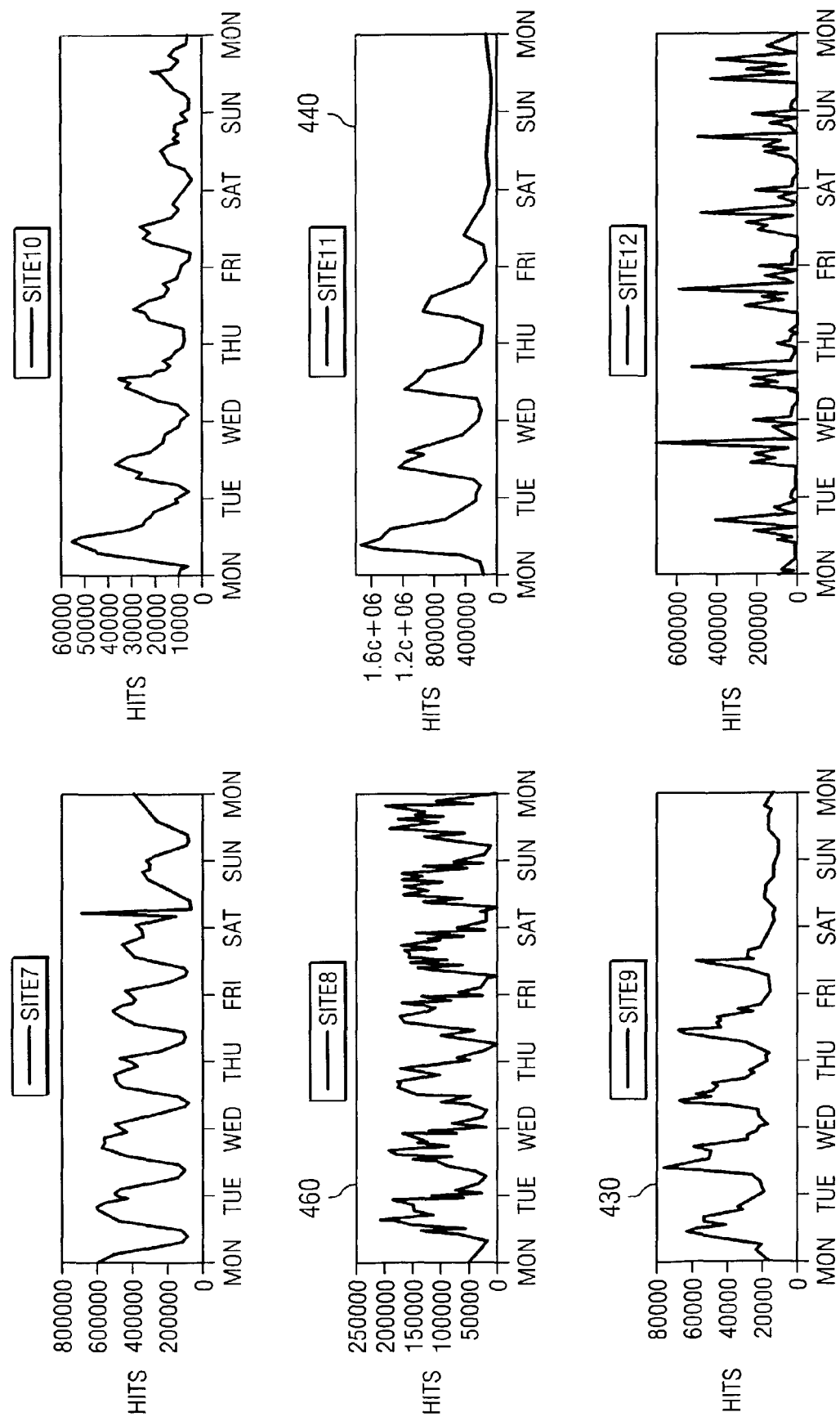
Figure 4C:
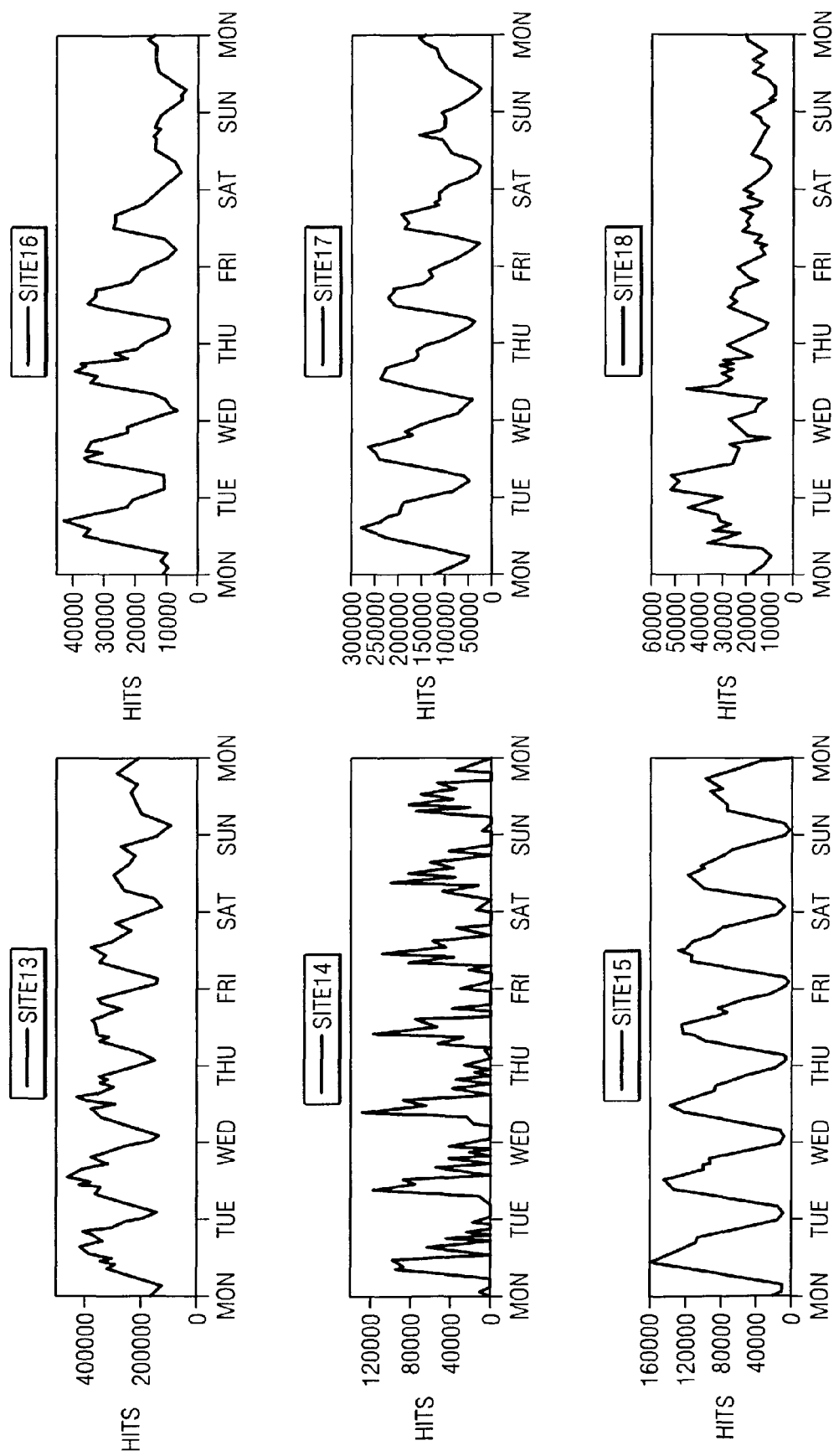

FIGS. 4A-4C are exemplary diagrams of hourly hits over a period of one week for exemplary commercial web sites. In the plots shown in FIGS. 4A-4C, the measure of number of hits per hour is used to characterize the incoming request patterns from client devices over each day of the week.

As can be seen from FIGS. 4A-4C, a large number of web sites exhibit daily access patterns for which there is a considerable drop in the request rate (both hits and pages) over Saturdays and Sundays relative to the other days of the week. Some of the web sites across different industries often have clear weekend patterns, as illustrated in the first plot 410, the third plot 420, the ninth plot 430 and the eleventh plot 440 in FIGS. 4A and 4B, where there is a significant drop in the request rate over the weekend. Other web sites, such as 450 have weaker yet still prevalent weekend patterns with less significant drops in the request rate over the weekend. Still other web sites, such as 460, do not exhibit any weekend patterns.

Figure 5A:
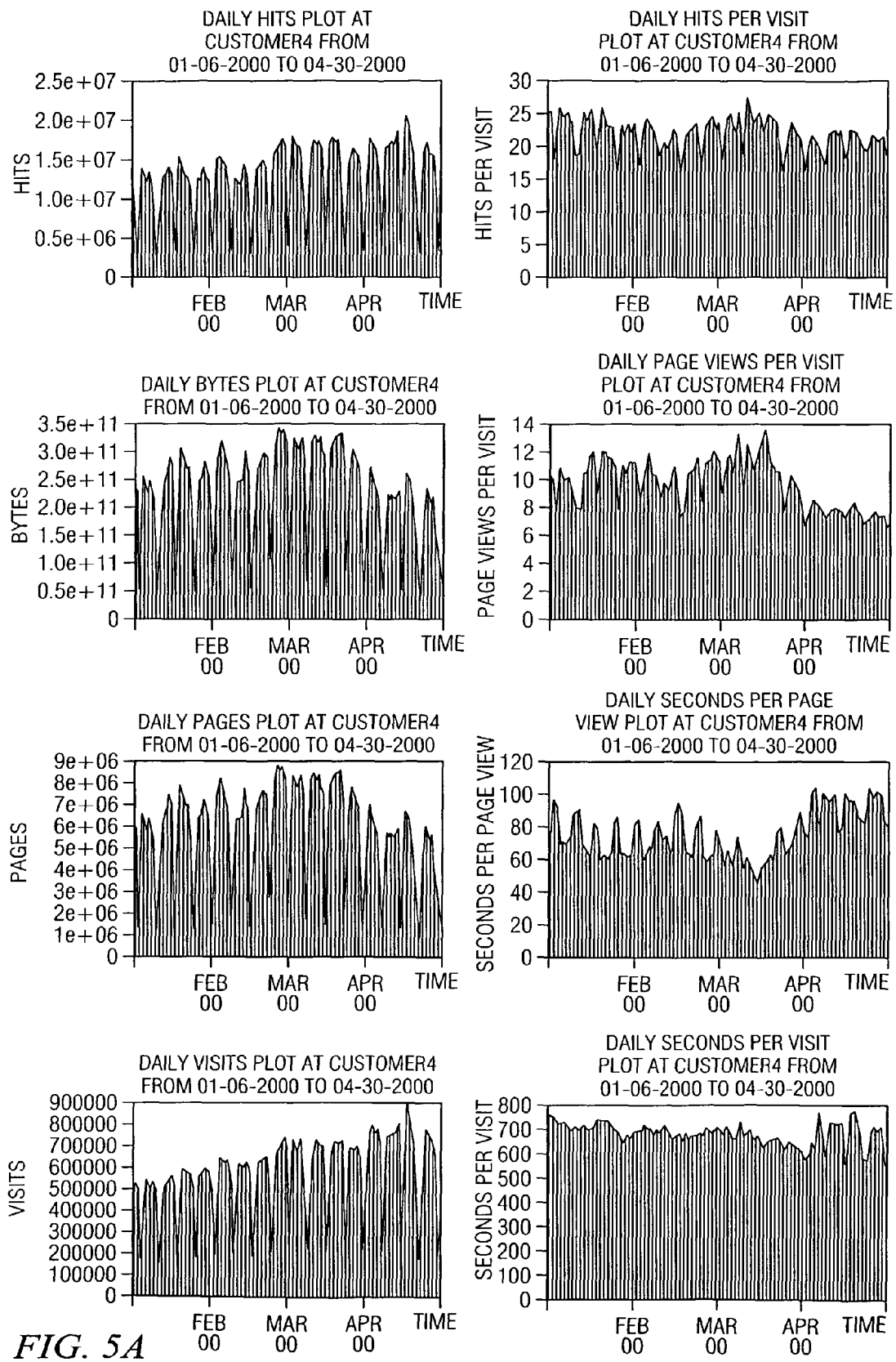
FIGS. 5A-5C are exemplary diagrams of daily time-series plots of the exemplary commercial web sites in FIGS. 4A-4C.
Figure 5B:
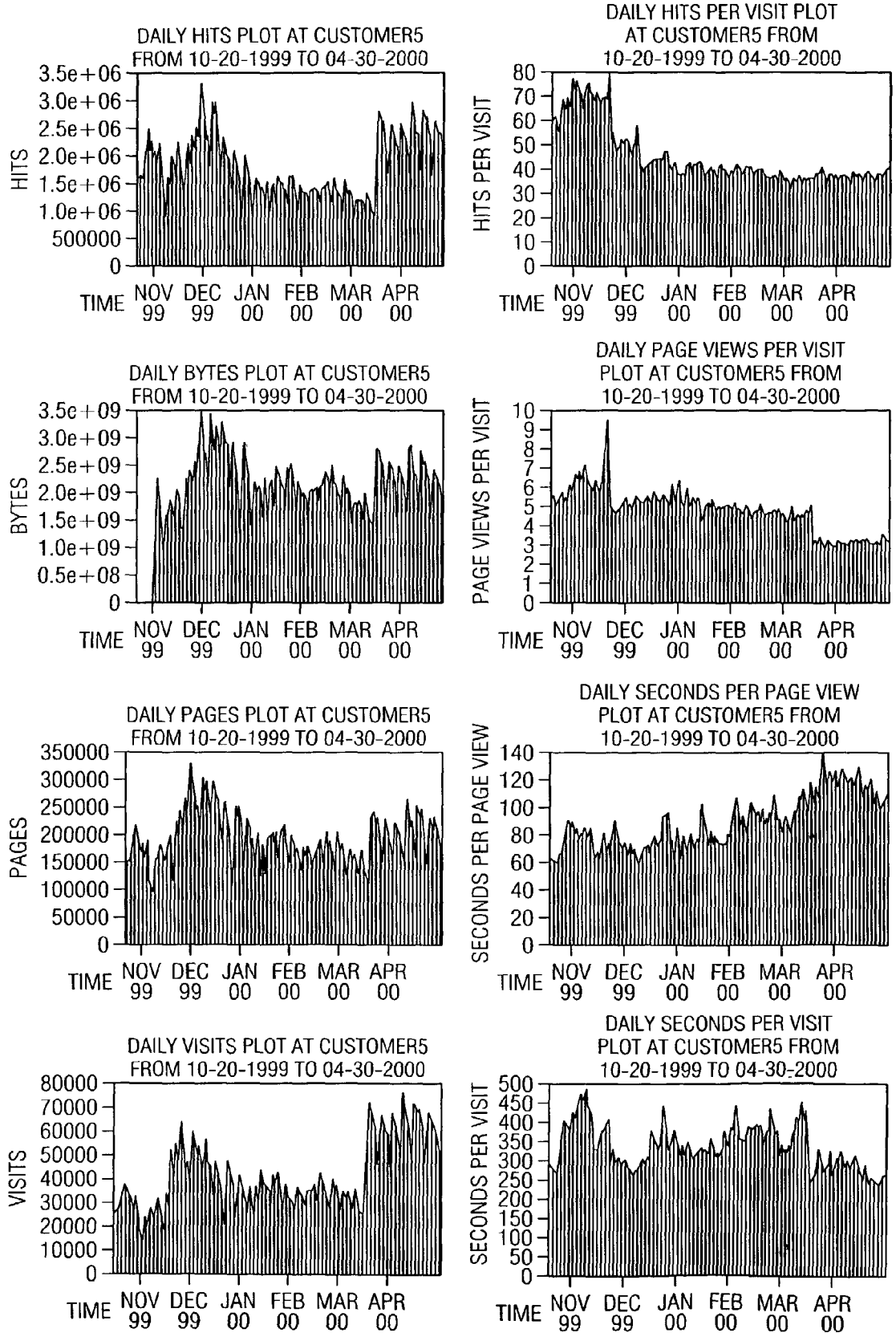
Figure 5C:
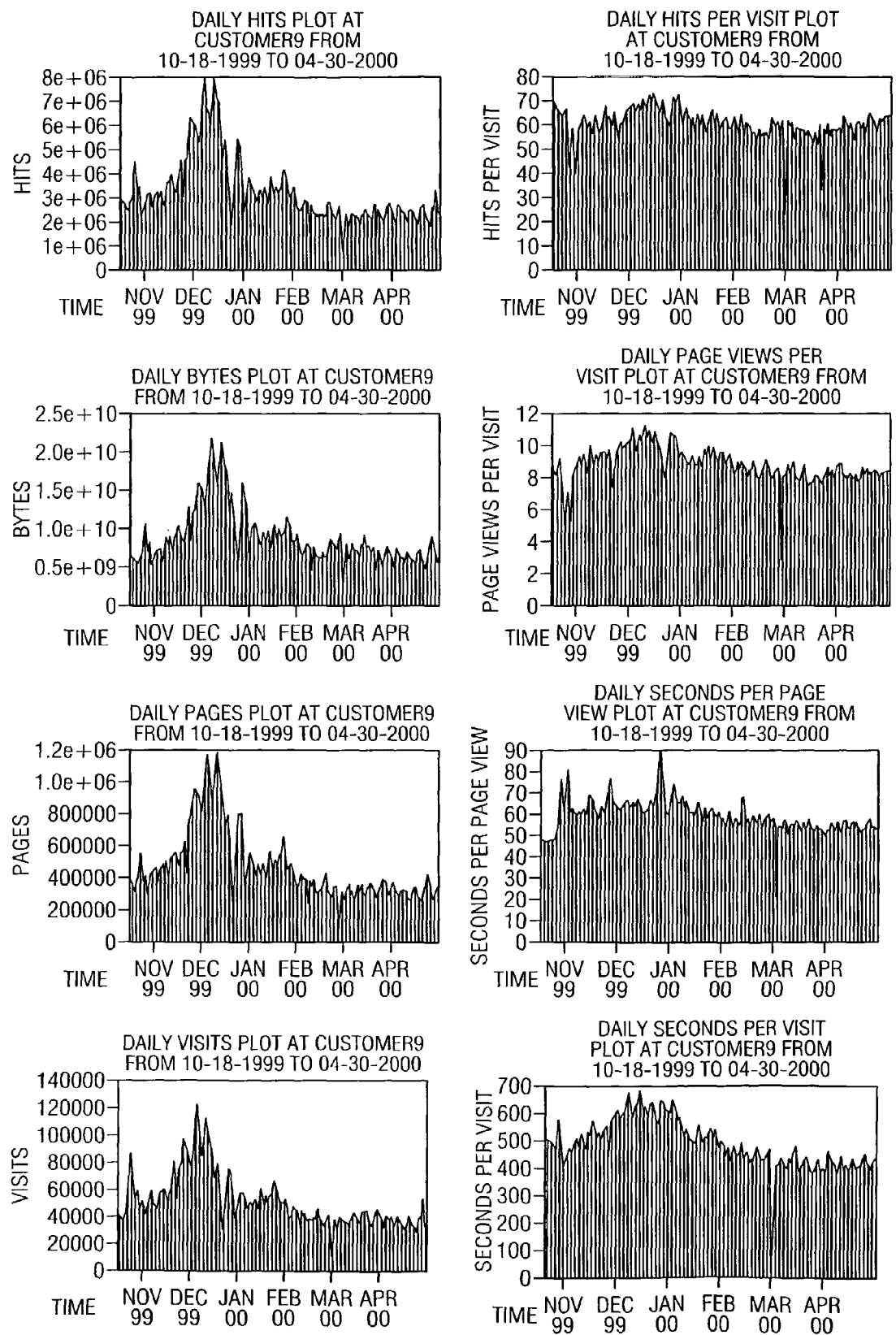

A similar pattern is prevalent in traffic data for different time scales, e.g., daily, weekly, monthly, and for other measures of request patterns, e.g., number of bytes, page views, visits, hits per visit, etc. FIGS. 5A-5C are exemplary diagrams of daily time-series plots of some of the exemplary commercial web sites in FIGS. 4A-4C for various measures. From FIGS. 5A-5C it can be seen that weekend effects of varying degrees for the web sites are present in these other measures. Certain web sites with weekend patterns also exhibit very consistent week-to-week behavior in which request measures do not change much from one week to the next.

In short, from the empirical data shown in FIGS. 4A-4C and 5A-5C, it is clear that many web sites experience patterns in their traffic. In addition to the above empirical characteristics, various statistical measures can be used to identify and examine some of the most complex characteristics of the user request patterns, at different time scales, in traffic for web sites. Such characteristics include, for example, the traffic variability and the peak to mean ratio, which are less visible and can only be computed from the time-series data.

Figure 6:
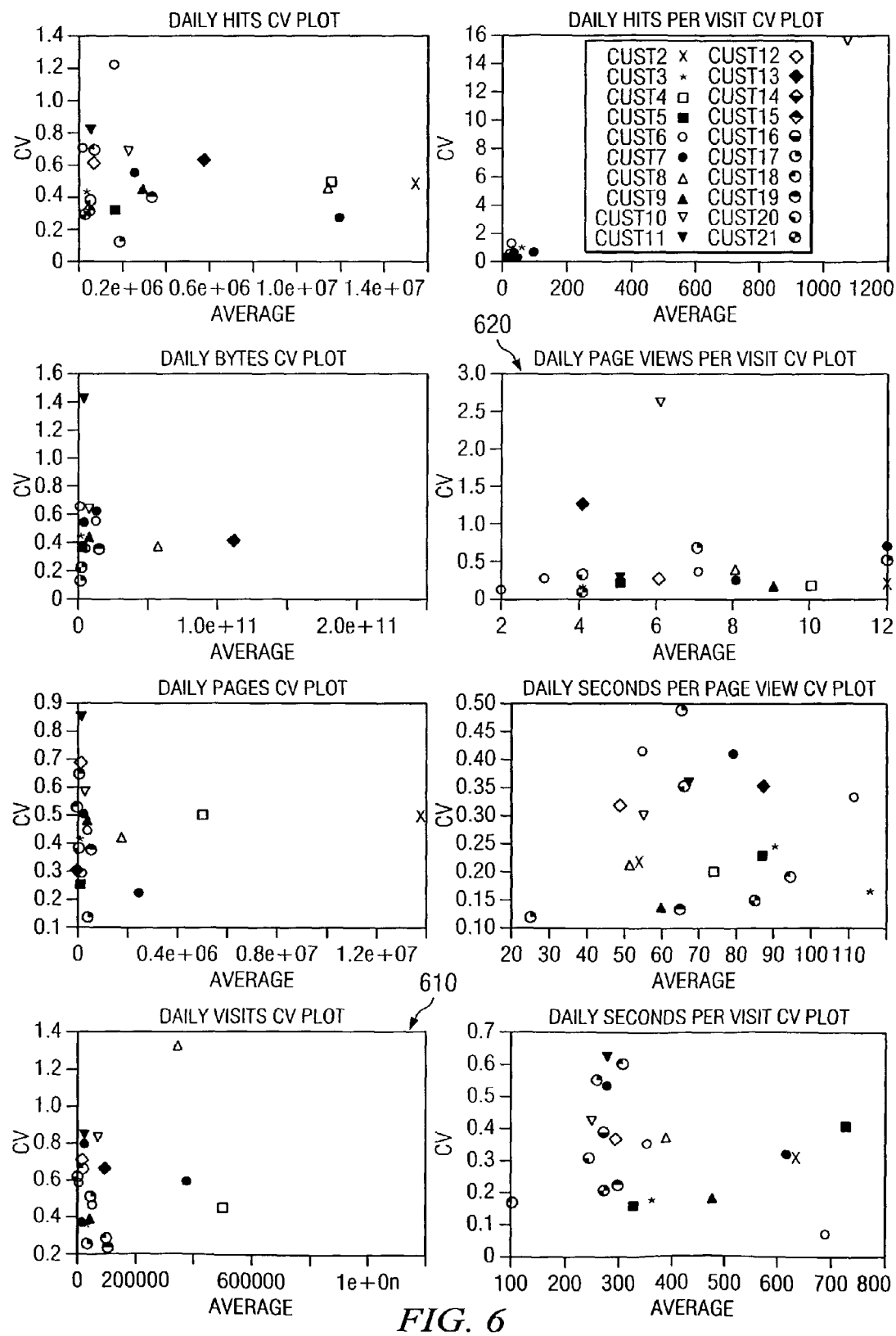
FIG. 6 is an exemplary diagram of daily coefficient of variation as a function of the daily average for different measures encountered at exemplary commercial web sites.

Some useful aspects of the variability of a request time series can be examined by the coefficient of variation (CV) of the overall request volume, i.e. the ratio of the standard deviation to the mean. For example, FIG. 6 is an exemplary diagram of the daily coefficient of variation of different measures as a function of the daily average for these measures that are encountered at exemplary commercial web sites. From FIG. 6 it can be seen that under some measures (e.g., daily visits plot 610), different sites exhibit quite different variabilities but similar daily averages while under some other measures (e.g., daily pageview per visit 620), different sites exhibit similar variabilities but different daily averages.

Figure 7:
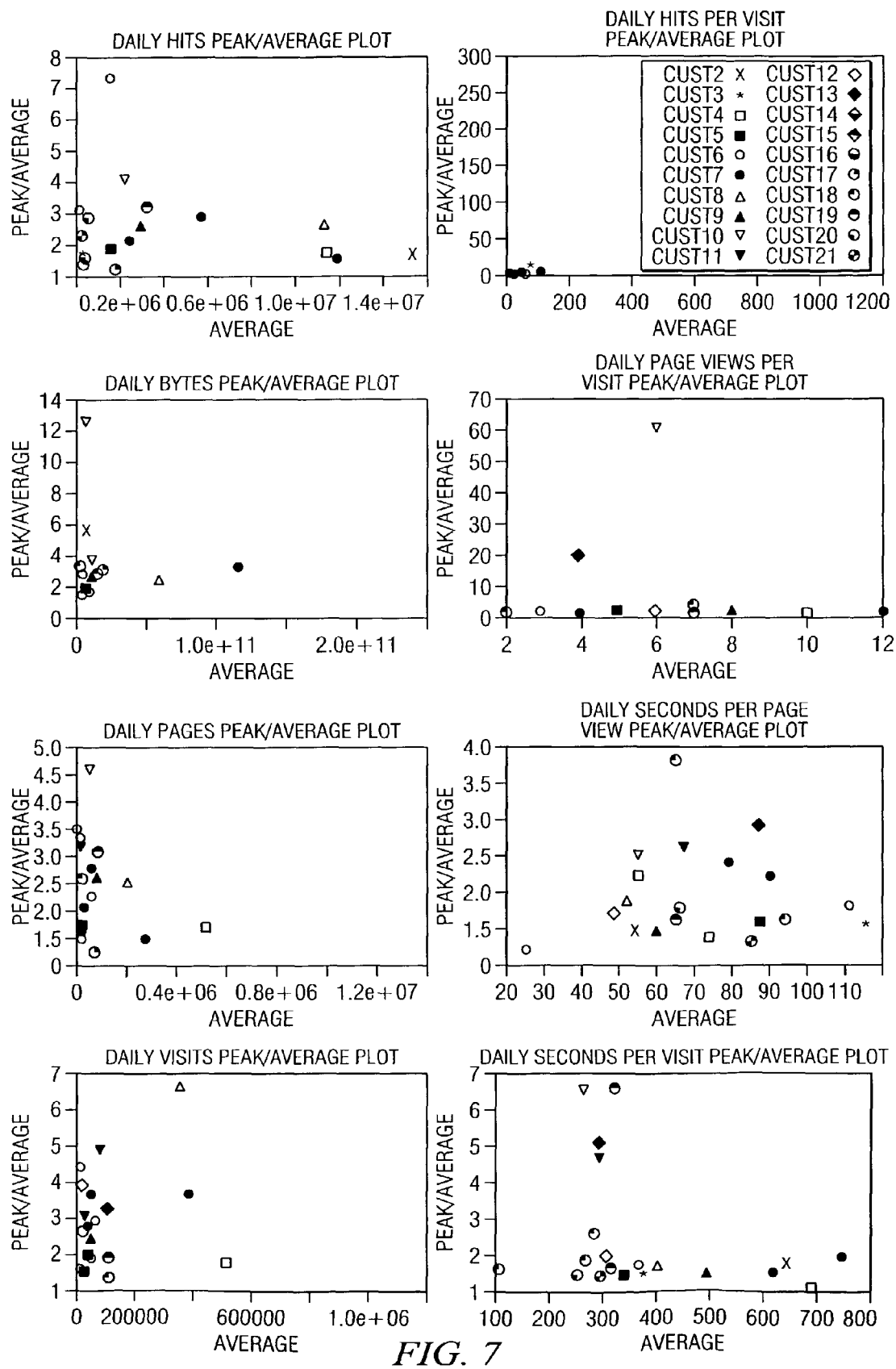
FIG. 7 is an exemplary diagram of daily peak to mean ratio as a function of the daily average for different measures encountered at exemplary commercial web sites.

One rough measure of burstiness in the request patterns is the ratio of the peak to mean request rate over a certain interval of time. This measure quantifies the peak request volume relative to the average request volume. FIG. 7 is an exemplary diagram of the daily peak to mean ratio for different measures as a function of the daily average for these measures that are encountered at exemplary commercial web sites. From FIG. 7 we observe similar behavior as in FIG. 6, namely different statistical properties of various measures can provide very different results.

Thus, while the results of the above empirical and statistical data analyses clearly illustrate that web sites experience patterns in their traffic, most of these results by themselves are not easily exploitable as the basis for our clustering, profiling and classification purposes. The present invention provides a mechanism for exploiting these traffic patterns to generate accurate models of the web sites for use in workload characterization, performance modeling, workload and performance forecasting, and capacity planning.

The present invention may be broken into three primary components: clustering, profiling and characterizing web sites. The first step of characterizing web sites is to generate clusters of web sites based on traffic data obtained for these web sites. Once the clusters are identified, each cluster, or class, is profiled to obtain a template for the class. Thereafter, as new traffic data is obtained for a web site, the traffic data may be compared against established templates for the classes in order to categorize the web site into one of the known classes. Alternatively, if the comparison results in the web site being sufficiently different from all of the known classes, a new class may be generated using the traffic data for the web site. This classification may then be used to perform functions such as workload characterization, performance modeling, workload and performance forecasting, and capacity planning, in order to best optimize the available resources for the web site.

As mentioned above, the first step in the operation of the present invention is to obtain traffic data from a plurality of web sites and cluster the web sites based on their traffic data. Clustering involves selecting a measure of traffic data to be used to cluster web sites and then identifying templates of the traffic data with regard to this selected measurement for each of the web sites. The templates are then clustered using a clustering algorithm which identifies groups of templates that are most similar to one another within a given tolerance. These groups, or classes, are the clusters of web sites that will be used to perform profiling and classification.

As mentioned above, the particular measure of traffic data used to perform the clustering must be selected prior to performing the clustering. Depending on the subset of measurement data used, different clustering results can be obtained. For example, web sites can be clustered according to the load/request patterns, user navigation patterns, site hypertext structures, etc. Each of these clusterings are different and can be considered orthogonal to one another. The particular clustering performed with the present invention may be selected based on the particular implementation of the present invention and the measures that are most important to a user of the present invention.

Figure 8:
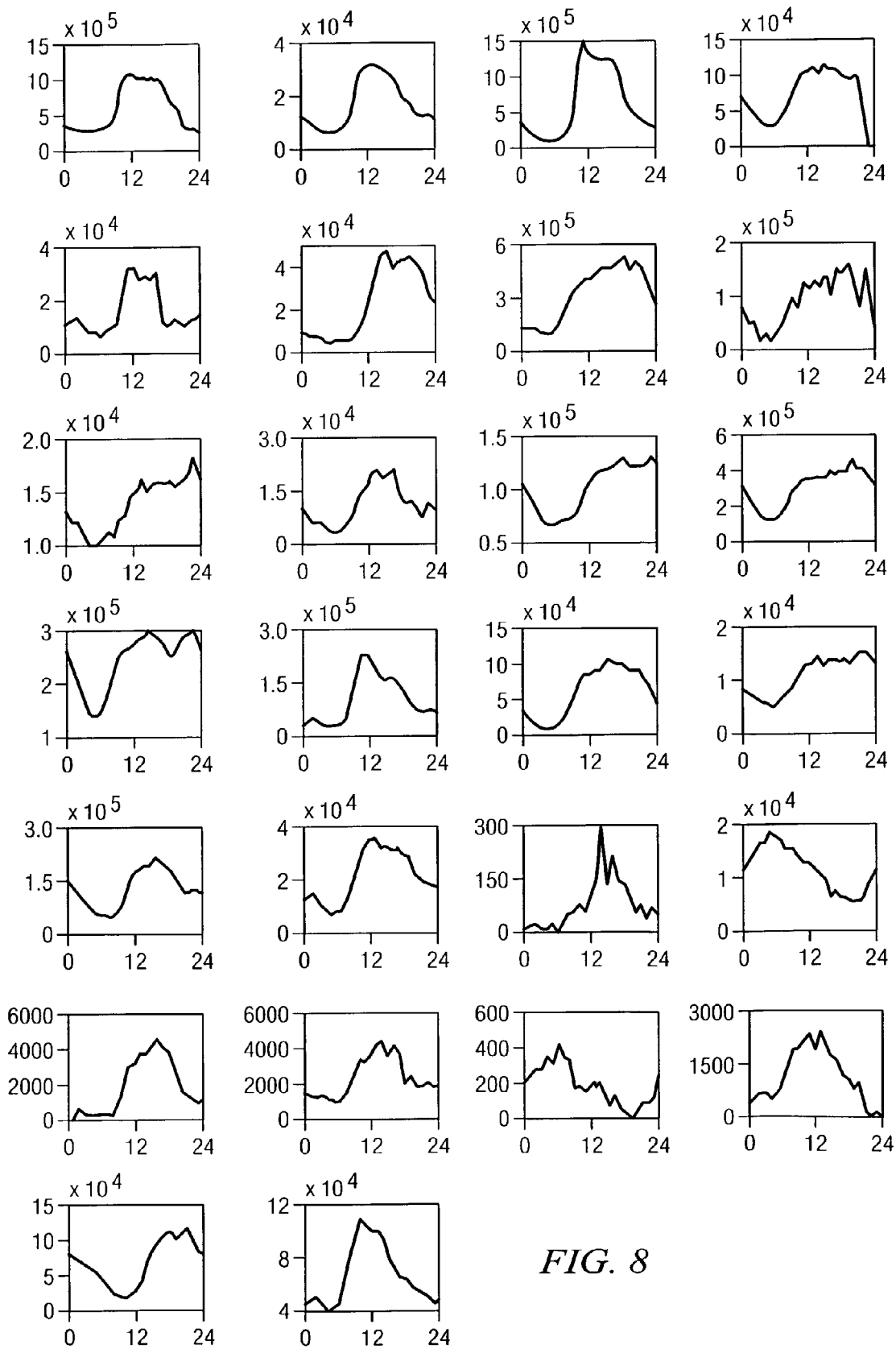
FIG. 8 is an exemplary diagram illustrating requests per hour over one day collected from exemplary commercial web sites for use in clustering the web sites.

In an exemplary embodiment of the present invention, the clustering is performed according to load patterns. For this purpose, the number of hits per hour is used as representative traffic data for characterizing the incoming request traffic patterns. FIG. 8 is an exemplary diagram illustrating requests per hour over one day collected from exemplary commercial web sites for use in clustering the web sites according to this exemplary embodiment.

Once the measurement of traffic data that is to be used to perform clustering is selected, the traffic data is then analyzed to identify templates, or typical shapes, in the traffic data with regard to this selected measurement. This template is essentially the time series data values for the selected measurement, or a function of these time series data values for the selected measurement.

In the exemplary embodiment of the present invention, the weighted average request pattern $\mu_i$ (h) representing the weighted mean of the hourly request pattern profile that occurs on a web server is utilized as a template for the web site. The weighted average request pattern $\mu_i$ (h) is obtained using the following equation:

$$\mu_i(h) = \sum_{d=1}^{D} (a_i(d)/D)(x_i(h, d)) \quad (1)$$

where $x_i$ (h, d) denotes the number of requests from the empirical data that the ith web server receives in the hth hour of day d, h=0,1, . . . ,n, and where the weights $a_i(d)$ are the weight for day d of site i so that the workloads of different days are normalized to the same mean. Moreover, with the exemplary embodiment, the peak load regimes are determined to be the focus of the clustering since they have a more significant impact on web server performance. Thus, each weighted average request pattern is normalized by its maximum value and its peak hour traffic pattern is defined as follows:

$$\eta_i(h) = \{\mu_i(h)/m_i, \mu_i(h)/m_i > 0.5, 0.5, \mu_i(h)/m_i \leq 0.5 \quad (2)$$

where $m_i = \max_h \{\mu_i(h)\}$.

A dissimilarity measure between the peak hour patterns is defined as:

$$\delta_{i,j} = \min_{h^\delta} \max_h \{|\eta_i(h) - \eta_j(h + h^\delta \mod 24)|\} \quad (3)$$

where $h^\delta$ is used as the hourly shift needed when comparing two traffic patterns from different web servers with, for example, differences in time zones. This dissimilarity measure is the minimum of the maximum difference between the normalized weighted average request pattern for web site i and the normalized weighted average request pattern for web site j, shifted to compensate for the differences in time zones, if any. This dissimilarity measure is used to identify the normalized weighted average request patterns that are most similar to one another in order to cluster the patterns into classes of web sites.

In the exemplary embodiment, a complete linkage, or furthest neighbor, algorithm is used to cluster the normalized weighted average request patterns based on the dissimilarity measure. That is, in a first step, each pattern represents its own cluster and the distances between these patterns are defined by the dissimilarity measure given in equation 3 above. Then, the two patterns with the smallest distances are linked together. The distances between this new cluster and the other clusters (or individual patterns) are defined by the greatest distance between any two patterns in the respective clusters, i.e. by the furthest neighbors. As a result, the algorithm proceeds in subsequent steps to link more and more patterns together and to aggregate larger and larger clusters within a predetermined threshold.

Figure 9:
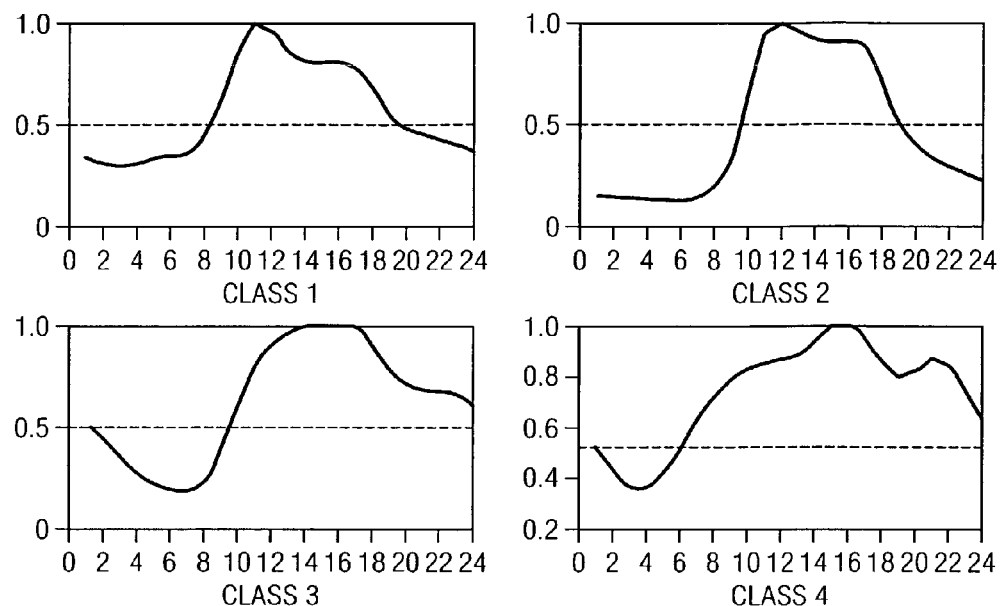
FIG. 9 is an exemplary diagram illustrating the patterns for four classes of request patterns into which the web sites of FIG. 8 are clustered.

In the exemplary embodiment, using a threshold of in the complete linkage algorithm, the request patterns shown in FIG. 8 are clustered into four distinct classes. FIG. 9 is an exemplary diagram illustrating the patterns for these four distinct classes of request patterns into which the web sites of FIG. 8 are clustered. From FIG. 9, the following observations about the various classes can be made. For class 1 patterns, the request traffic load increases to the peak level by noon and then goes down significantly in the afternoon. This suggests that users' interests for such web sites are more instantaneous, just like checking the weather report every day. The web sites are popular primarily in their local areas.

For class 2 patterns, the request traffic load increases to the peak level at noon and continues to remain high in the afternoon, but becomes very low in the evening. This suggests that users show their interests for these web sites primarily during working hours.

For class 3 patterns, the request traffic load increases to the peak level somewhat after noon and remains high throughout much of the afternoon. In the evening users continue to show some interest for these web sites.

For class 4 patterns, the request traffic load remains at a high level over a long period of time, from before noon well into the evening. This suggests that most of the users visit these web sites either during working hours or in their spare time and that the users are probably spread over the country and even the world.

By making such observations regarding the characteristics of web sites falling into each of these different classes, it is possible to predict the usage of a web site that is later classified into one of these classes. Thus, from such a prediction, various measures can be employed to handle the traffic that the web site should expect to experience.

Thus, according to a preferred embodiment of the invention, clustering of web sites involves obtaining traffic data for a plurality of web sites, determining a measure of the traffic data to use as a basis for the clustering, identifying a pattern of the traffic data in accordance with the selected measure, defining a dissimilarity or similarity relationship for the traffic data, and then using a clustering algorithm to cluster the web sites based on this dissimilarity or similarity relationship. Once these clusters are identified, profiling of the clusters is performed to identify a template for the cluster that may be used with later classification of web sites.

Profiling involves first determining a metric upon which the traffic profiles will be based. In an exemplary embodiment, the weighted average load $\mu_i$ (h) is used to generate the profiles for the identified classes of web sites. In generating the profile for a class, a template for the class is identified that is defined as a request pattern that is most similar to all of the members of the class.

One approach to finding the template for a class is to simply average all the members of the class. While this may be done to obtain a template for the class, the result will typically not be a good choice for a template for the class since an outer member of the class may be far from this template but close to the templates of other classes. Another underlying consideration is that the templates defined for different classes should be far from each other. Therefore, the template for a class is defined so that it minimizes the maximum difference to all members in the class.

Assume that $G_k$ denotes the set of request patterns that belong to class k. Though similar in shape, the members, i.e. the web sites, within class k may actually be located in different time zones, or include any other sources of shifted behavior. To define the template, it is therefore necessary to first identify the correct shift biases $\{h_i^\delta, i \in G_k\}$ so that upon the shift, all members have the closest shapes. Such shift biases can be solved via the following mathematical expression:

$$\text{Min}\{\max \max[|\eta_i(h+h_i^\delta \text{ mod } 24) - \eta_j(h+h_j^\delta \text{ mod } 24)|]\}\{h_i^\delta, h_j^\delta, i, j \in G_k\}h \quad (4)$$

That is, upon the shift $\{h_i^\delta, i \in G_k\}$, the maximum difference between any two members of the class should be minimized. The particular shift, in an exemplary embodiment, may be identified using a shifting algorithm such as that set forth below. Other algorithms for identifying the particular shift may be used without departing from the spirit and scope of the present invention.

In an exemplary embodiment, the shift algorithm involves a first step in which the set $\{h_i^{\delta, i \in G}{}_k\}$ is to be arbitrary integers between 0 and 23 (possible shift in hours). Then for each $i \in G_k$ the shift value $h_i^\delta$ is updated so that:

$$H_i^\delta = \arg\min\{\max\max[|\eta_i(h+h_i^\delta \text{ mod } 24) - \eta_j(h+h_j^\delta \text{ mod } 24)|]\}h_i^\delta\{i, j \in G_k\}h \quad (5)$$

This step is then repeated until $\{h_i^\delta, i \in G_k\}$ converges to a local optimum.

Thus, for each $i \in G_k$, $h_i^\delta$ is chosen so that upon the shift, member i is close to all other members of the class. The procedure is then repeated iteratively until no further improvement can be obtained.

Figure 10A:
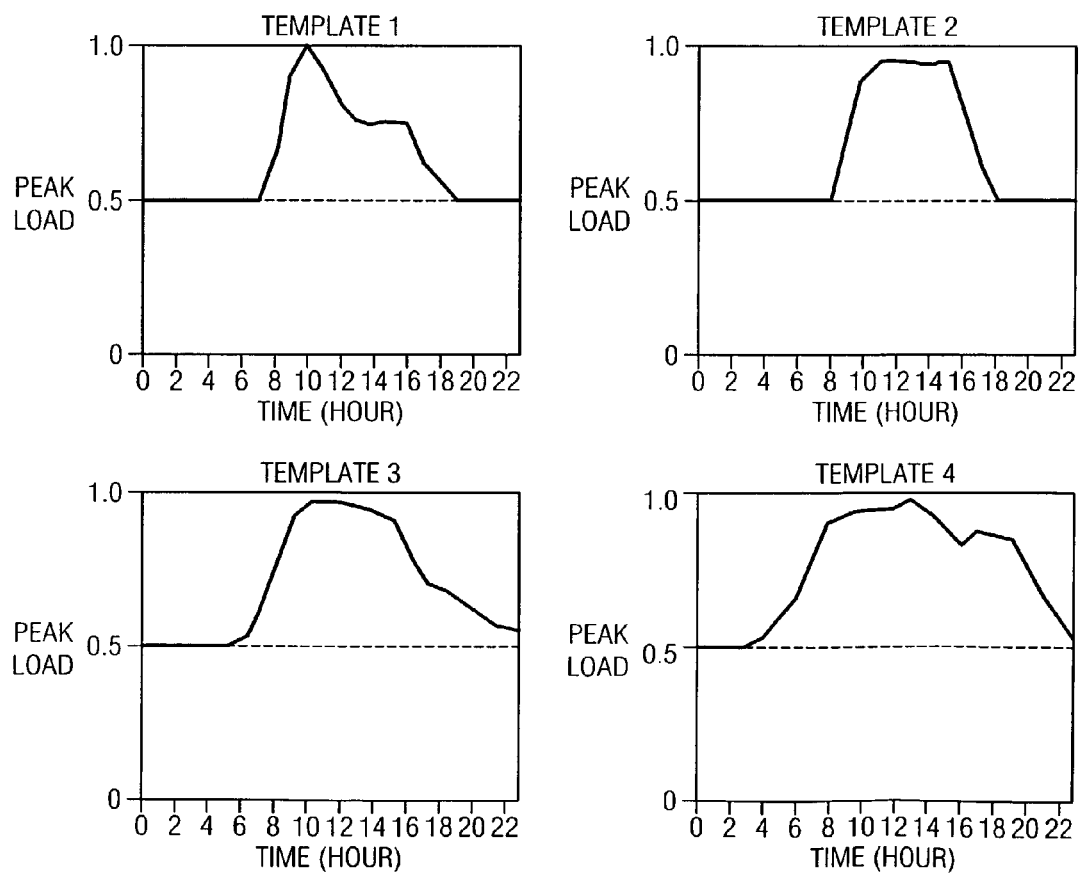
FIG. 10A is an exemplary diagram illustrating the four templates for the four classes of request patterns of FIG. 9.
Figure 10B:
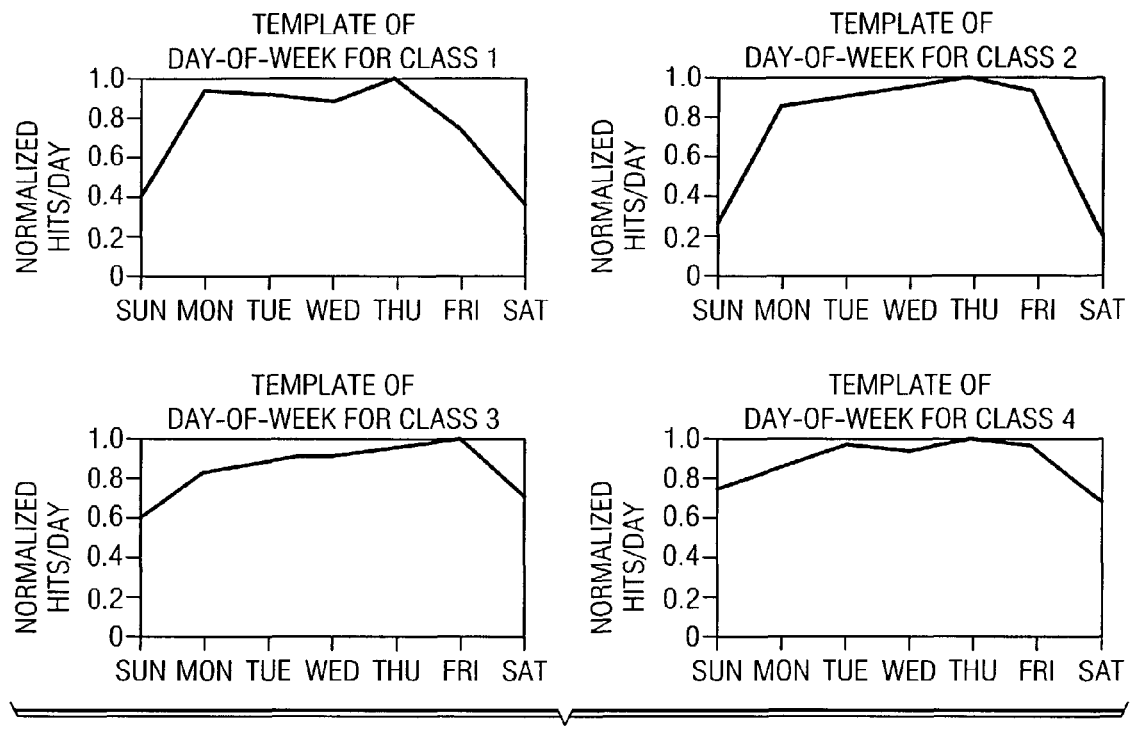
FIG. 10B is an exemplary diagram illustrating the day of the week patterns generated by applying the clustering and profiling of the present invention to the empirical data for the web sites of FIGS. 4A-4C.

Once the optimal shift biases $\{h_i^\delta, i \in G_k\}$ are identified, the template of class k is defined to be:

$$Tk(h) = \frac{1}{2}\{\max\{\eta_j(h+h_j^\delta \text{ mod } 24)\} + \min\{\eta_j'(h+h_j^\delta \text{ mod } 24)\}\} \quad (6)$$

for h=0,1, . . . ,23. That is, the template is the most similar pattern to the patterns for all of the members of the class. FIG. 10A is an exemplary diagram illustrating the four templates for the four classes of request patterns of FIG. 9 generated using the clustering and profiling of the present invention. Applying this same clustering and profiling to empirical data, different templates may be generated for different traffic effects, such as day of the week, week of the month, month of the year, etc. For example, as shown in FIG. 10B, the day of the week patterns are shown which are generated by applying the clustering and profiling of the present invention to the empirical data for the web sites of FIGS. 4A-4C.

The templates for the classes generated using the clustering and profiling described above may be used to recognize incoming request patterns. First, the templates are used to recognize the existing samples and to check if the results of this recognition are consistent with the clustering. Thereafter, the request pattern is matched to a class of requests based on the template. From this matching, certain characteristics of the web site traffic may be discerned based on the characteristics of the other web sites that are part of the class.

Preferably, in order to perform the classification, equations 1 and 2 above are used to compute the normalized peak hour request pattern for newly collected data. Thereafter, equation three is preferably used to compute the distance measures between the incoming request pattern data and the data for the four templates. Based on these distance measures, a closest matching template may be identified and the incoming request pattern classified into the corresponding class.

Since the predetermined templates may not cover all possible request patterns, a new type of request pattern or an extraordinary request pattern may be far from all of the predetermined templates, i.e. the minimum distance is greater than a threshold amount. In such cases, the new request pattern may be added as a new template for a new class of request patterns.

By clustering, profiling and classifying web sites according to the present invention, characteristics about web site traffic may be identified based on the web sites falling into the same class. This classification may be used with many different types of applications including traffic prediction, capacity planning, hot-spot detection, dynamic off-loading, web site co-location, and the like.

With regard to traffic prediction, one key issue in capacity planning is the prediction of workload behavior. The prediction mechanism needs to capture the characteristics of long-term trends, periodicity, dependency and variability. It is difficult to use a single technique to capture all of these factors. Therefore, a more accurate approach would be to use a hybrid technique pertaining to both macro and micro level statistics. While long-term trends may be measured using linear regression methods, the periodicity at different scales (e.g., monthly, weekly, daily, etc.) may be handled using the clustering and profiling technique of the present invention.

The clustering approach of the present invention can greatly simplify the capacity planning task. With the present invention, the templates (or profiles) of different clusters (or classes) may be used to analyze the capacity demand for each individual profile, the impact of the scaling factor, and the mixtures of the profiles for servers in a web server farm, cluster, or the like. When a new customer comes along, the classification technique of the present invention may be used to determine the cluster to which the new customer's traffic belongs so as to adjust the capacity requirements, if necessary. In the same way, short-term capacity planning decisions may also be easily adjusted if some web sites cause the clusters to change because of special events, web site redesign, etc.

With special events, e.g., holiday sales for e-commerce web sites, some web sites can be heavily loaded and thus, require certain additional operations in order to fulfill the needed quality of service. Examples of such operations include offloading and adding new resources. Such special events represent "hot-spots." With hot-spot detection, the goal is to detect the hot-spots so that appropriate mechanisms for handling the hot-spots may be triggered. With the profiling approach of the present invention, these hot-spots can be detected once it is observed that the current workload is deviating significantly from typical behavior which is described by the templates.

As mentioned above, sometimes dynamic offloading operations are needed in order to alleviate server overload, such as when a hot-spot is encountered. One way to achieve this dynamic offloading is to create new (or use different) versions of the web pages with references of offloadable objects (such as images) to the server onto which some of the extra load can be offloaded (such as Akamai servers). With proper use of the templates of the present invention, it is easy to determine what is the threshold beyond which traffic should be offloaded. Moreover, the offloading scheme may be started before the server is saturated in order to account for the lag time of the offloading scheme. This new threshold, i.e. the threshold accounting for lag time, may be determined from the template together with the lag time.

With web site co-location, the goal is to share resources among multiple web sits so that peak load conditions for any given web site can be handled by borrowing resources from the other entities. An important problem in this paradigm concerns the clustering of the web sites for resource sharing. Based on the observed traffic templates, one can easily identify the shapes of the peak regimes for the different sites, as well as the different traffic peaks and valleys at different times and at different geographical time zones. Optimization tools may then be used to achieve load balancing across a number of web sites in order to obtain the smoothest possible overall peak loads. The optimization problem can be considered as a general bin packing problem where the items are the templates. This also can be formulated as an integer programming problem.

It should be noted that while the above embodiments of the present invention have been described with regard to request patterns, the present invention is not limited to such. Rather, any measurement data for web sites may be used to perform the clustering, profiling and classification of the present invention. For example, the present invention may operate on server utilization data, bandwidth consumption data, or the like.

Figure 11:
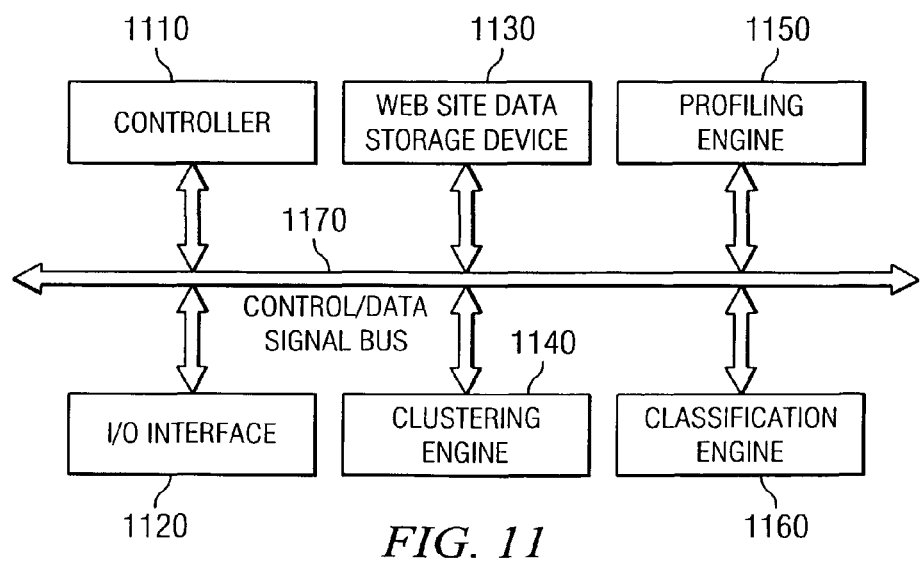
FIG. 11 is an exemplary block diagram of a web site classification device according to the present invention.

FIG. 11 is an exemplary block diagram of a web site classification device according to the present invention. The elements shown in FIG. 11 may be implemented in hardware, software, or any combination of hardware and software without departing from the spirit and scope of the present invention. In a preferred embodiment, the elements of the web site classification device are implemented as software instructions executed by one or more processors.

As shown in FIG. 11, the web site classification device includes a controller 1110, an input/output interface 1120, a web site data storage device 1130, a clustering engine 1140, a profiling engine 1150, and a classification engine 1160. The elements 1110-1160 are in communication with one another via the control/data signal bus 1170.

The controller 1110 controls the overall operation of the web site classification device and orchestrates the operation of the other elements 1120-1160. The controller 1110 receives web site traffic data from web sites via the input/output interface 1120 and stores this web site traffic data in the web site data storage device 1130. The controller 1110 then instructs the clustering engine 1140 to cluster the web sites for which data is stored in the web site data storage device 1130.

Once the clustering is performed, and the web sites are assigned to particular classes of web sites, the controller 1110 instructs the profiling engine 1150 to generate a template, or profile, for each of the classes. The clustering and profiling may be performed on a periodic basis such that the clusters maintained by the web site classification device, and their corresponding templates or profiles, are updated as new web site traffic data becomes available. Alternatively, the clustering and profiling may be updated each time traffic data is received from a new web site so as to include this new web site into the clusters and templates maintained by the web site classification device.

When a traffic data is received from a new web site, the traffic data is compared to the templates for the various classes maintained by the web site classification device. From this comparison, a determination may be made as to whether the traffic data for the new web site fits the template for one of the classes or is sufficiently dissimilar to all of the templates for the classes so as to warrant the creation of a new class and template based on the traffic data for the new web site. From this classification of the traffic data for the new web site, the new web site is assigned to a particular class of web sites or is used to generate its own class of web sites. As noted above, this classification may then be used by different processes to perform resource management functions such as workload characterization, performance modeling, workload and performance forecasting, capacity planning, and the like.

Figure 12:
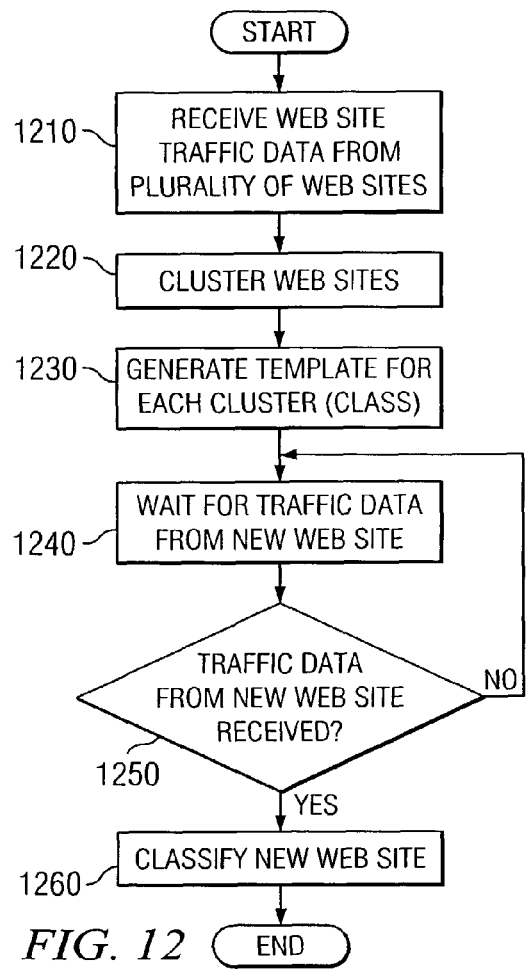
FIG. 12 is a flowchart outlining an exemplary operation of the present invention.

FIG. 12 is a flowchart outlining an exemplary operation of the present invention. As shown in FIG. 12, the operation of the present invention starts with receiving web site traffic data from a plurality of web sites (block 1210). The web site traffic data is then clustered using the clustering technique discussed above (block 1220). For each cluster, or class, a template or profile is generated (block 1230).

The operation then waits for traffic data from a new web site (block 1240). A determination is then made as to whether traffic data for a new web site is received (block 1250). If not, the operation returns to block 1240 and continues to wait for traffic data from a new web site. If traffic data for a new web site is received, the traffic data for the new web site is classified based on the existing classes of web sites (block 1260). The operation then ends.

Figure 13:
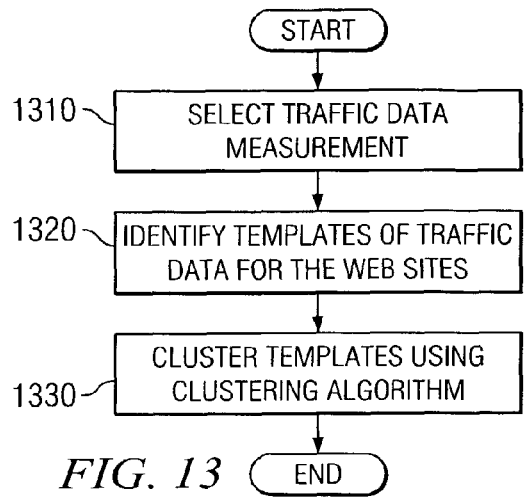
FIG. 13 is a flowchart outlining an exemplary operation of the present invention for clustering web sites.

FIG. 13 is a flowchart outlining an exemplary operation of the present invention for clustering web sites. As shown in FIG. 13, the clustering operation of the present invention starts by selecting a traffic data measurement by which to perform the clustering (block 1310). Templates of the traffic data for the web sites with regard to the selected traffic data measurement are then identified (block 1320). The templates are then clustered using a clustering algorithm (block 1330).

Figure 14:
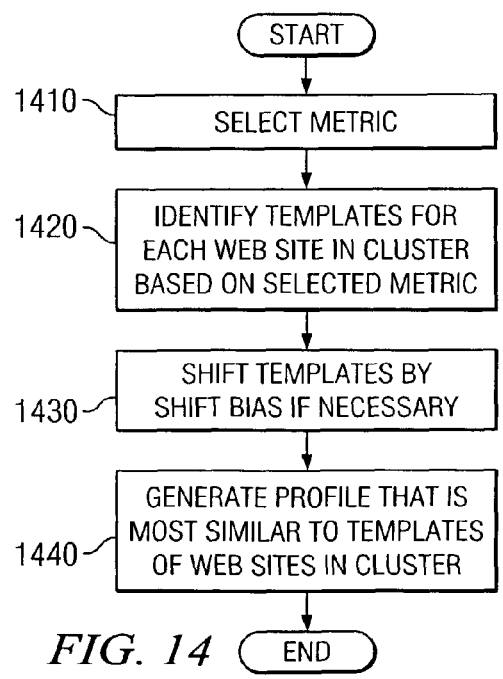
FIG. 14 is a flowchart outlining an exemplary operation of the present invention for clustering web sites.

FIG. 14 is a flowchart outlining an exemplary operation of the present invention for profiling web sites. As shown in FIG. 14, the operation starts with determining a metric upon which the traffic profiles will be based (block 1410). Templates for each web site's traffic data in the class are generated based on this selected metric (block 1420). The templates are then shifted by a shift bias amount, if necessary, to compensate for factors such as different time zones (block 1430). A profile is then generated by selecting a profile that is most similar to all of the templates for the web sites in the class (block 1440). This operation may be performed for each class of web sites.

Figure 15:
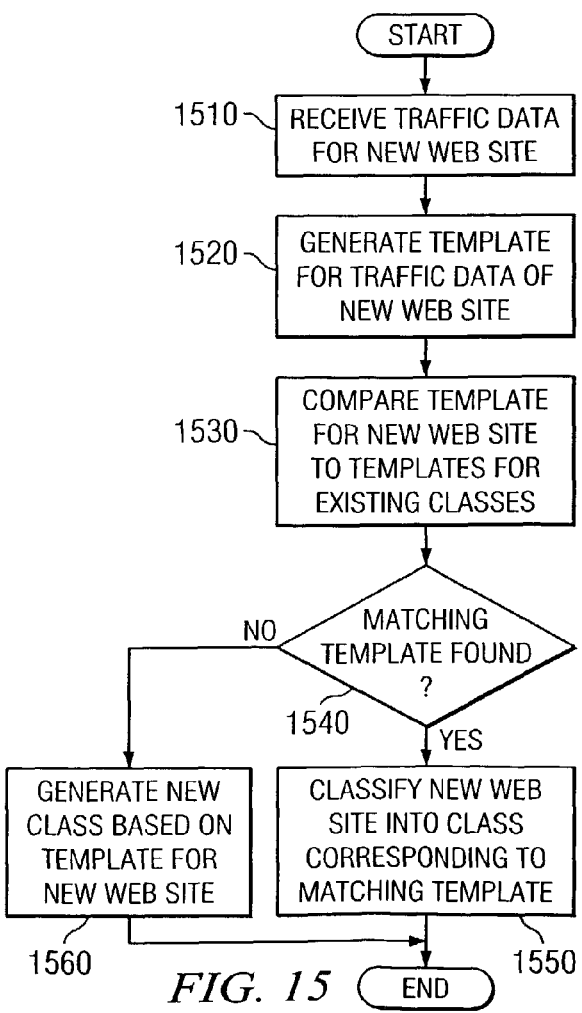
FIG. 15 is a flowchart outlining an exemplary operation of the present invention for classifying web sites.

FIG. 15 is a flowchart outlining an exemplary operation of the present invention for classifying web sites. As shown in FIG. 15, the operation for classifying web sites starts with the receipt of traffic data for a new web site (block 1510). A template for the traffic data for the new web site is generated (block 1520) and compared to the templates for the existing classes of web sites (block 1530). A determination is made as to whether a matching template is identified (block 1540). If so, the web site is classified into the class associated with the matching template (block 1550). If not, a new class is generated using the traffic data for the new web site as a basis for generating a template for the new class (block 1560). The operation then ends.

Thus, the present invention provides mechanisms for the clustering, profiling and classification of web sites based on their traffic data. With the present invention, similarities between web sites with regard to their experienced traffic may be identified for use in predicting and planning for workloads that are most likely to be experienced in the future. Thus, the present invention provides a tool through which resource management for web servers may be performed with regard to the web sites they host.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product in a non-transitory computer readable medium for characterizing a web site, comprising:
   first instructions for receiving traffic data for the web site;
   second instructions for matching the traffic data to a matching traffic template of a plurality of predefined traffic templates; and
   third instructions for characterizing the web site based on characteristics of the matching traffic template;
   fourth instructions for receiving traffic data for a plurality of web sites;
   fifth instructions for clustering the plurality of web sites into two or more clusters based on the traffic data, wherein the fifth instructions include calculating a dissimilarity measure between each pair of web sites in the plurality of web sites, and clustering the plurality of web sites based on the dissimilarity measures for each pair of web sites.

2. The computer program product of claim 1, further comprising:
   sixth instructions for profiling the two or more clusters based on traffic data for member web sites of each cluster, to generate the plurality of predefined traffic templates.

3. The computer program product of claim 1, wherein the fifth instructions for clustering include instructions for using a nearest neighbor clustering algorithm on traffic patterns of the traffic data for the plurality of web sites.

4. The computer program product of claim 1, wherein the fifth instructions for clustering the plurality of web sites into two or more clusters based on the traffic data include:
   instructions for identifying a traffic pattern for each web site in the plurality of web sites; and
   instructions for clustering the plurality of web sites based on similarities between the traffic pattern for each web site and each other web site in the plurality of web sites.

5. The computer program product of claim 4, wherein the traffic pattern is a normalized weighted average request pattern.

6. The computer program product of claim 4, wherein the fifth instructions for clustering the plurality of web sites into two or more clusters further include instructions for shifting one or more of the traffic patterns for each of the web sites in the plurality of web sites to compensate for differences in time zones.

7. The computer program product of claim 2, wherein the sixth instructions for profiling the two or more clusters include:
   instructions for identifying, for each cluster, a traffic template that is most similar to traffic patterns of all of the member web sites of the cluster.

8. The computer program product of claim 7, wherein the traffic template that is most similar to traffic patterns of all of the member web sites of the cluster is identified by averaging the traffic patterns of all of the member web sites of the cluster.

9. The computer program product of claim 7, wherein the traffic template that is most similar to traffic patterns of all of the member web sites of the cluster is identified by minimizing a maximum difference between the traffic template and each traffic pattern of each member web site of the cluster.

10. The computer program product of claim 1, wherein the second instructions for matching the traffic data to a matching traffic template of a plurality of predefined traffic templates include:
    instructions for determining if the traffic data does not match any of the plurality of predefined traffic templates; and
    instructions for generating a new traffic template based on the traffic data if the traffic data does not match any of the plurality of predefined traffic templates.

11. The computer program product of claim 1, further comprising:
    seventh instructions for performing at least one of traffic prediction, capacity planning and hot-spot detection based on the characterizing of the web site.

12. The computer program product of claim 2, further comprising:
    eighth instructions for identifying characteristics of the member web sites of each cluster; and
    ninth instructions for identifying characteristics of the cluster based on the characteristics of the member web sites of the cluster.

13. A method of characterizing a web site, comprising:
    receiving traffic data for the web site;
    matching the traffic data to a matching traffic template of a plurality of predefined traffic templates; and
    characterizing the web site based on characteristics of the matching traffic template;
    receiving traffic data for a plurality of web sites;
    clustering, by a processor, the plurality of web sites into two or more clusters based on the traffic data, wherein clustering the plurality of the web sites further includes calculating a dissimilarity measure between each pair of web sites in the plurality of web sites, and clustering the plurality of web sites based on the dissimilarity measures for each pair of web sites.

14. The method of claim 13, further comprising:
    profiling the two or more clusters based on traffic data for member web sites of each cluster, to generate the plurality of predefined traffic templates.

15. The method of claim 12, wherein clustering includes using a nearest neighbor clustering algorithm on traffic patterns for the traffic data for the plurality of web sites.

16. The method of claim 12, wherein clustering the plurality of web sites into two or more clusters based on the traffic data includes:
    identifying a traffic pattern for each web site in the plurality of web sites; and
    clustering the plurality of web sites based on similarities between the traffic pattern for each web site and the traffic pattern for each other web site in the plurality of web sites.

17. The method of claim 16, wherein the traffic pattern is a normalized weighted average request pattern.

18. The method of claim 16, wherein clustering the plurality of web sites into two or more clusters further includes shifting one or more of the traffic patterns for each of the web sites in the plurality of web sites to compensate for differences in time zones, 19. The method of claim 14, wherein profiling the two or more clusters includes:
   identifying, for each cluster, a traffic template that is most similar to traffic patterns of all of the member web sites of the cluster.

20. The method of claim 19, wherein the traffic template that is most similar to traffic patterns of all of the member web sites of the cluster is identified by averaging the traffic patterns of all of the member web sites of the cluster.

21. The method of claim 19, wherein the traffic template that is most similar to traffic patterns of all of the member web sites of the cluster is identified by minimizing a maximum difference between the traffic template and each traffic pattern of each member web. site of the cluster.

22. The method of claim 13, wherein matching the traffic data to a matching traffic template of a plurality of predefined traffic templates includes:
   determining if the traffic data does not match any of the plurality of predefined traffic templates; and
   generating a new traffic template based on the traffic data if the traffic data does not match any of the plurality of predefined traffic templates.

23. The method of claim 13, further comprising:
   performing at least one of traffic prediction, capacity planning and hot-spot detection based on the characterizing of the web-site.

24. The method of claim 14, further comprising:
   identifying characteristics of the member web sites of each cluster; and
   identifying characteristics of the cluster based on the characteristics of the member web sites of the cluster.

25. An apparatus for characterizing a web site, comprising:
   means for receiving traffic data for the web site;
   means for matching the traffic data to a matching traffic template of a plurality of predefined traffic templates; and
   means for characterizing the web site based on characteristics of the matching traffic template;
   means for clustering the plurality of web sites into two or more clusters based on the traffic data;
   means for calculating a dissimilarity measure between each pair of web sites in the plurality of web sites; and
   means for clustering the plurality of web sites based on the dissimilarity measures for each pair of web sites.

26. The apparatus of claim 25, further comprising:
   means for receiving traffic data for a plurality of web sites; and
   means for profiling the two or more clusters based on traffic data for member web sites of each cluster, to generate the plurality of predefined traffic templates.

27. The apparatus of claim 25, wherein the means for clustering includes means for using a nearest neighbor clustering algorithm on traffic patterns for the traffic data for the plurality of web sites.

28. The apparatus of claim 26, wherein the means for clustering the plurality of web sites into two or more clusters based on the traffic data includes:
   means for identifying a traffic pattern for each web site in the plurality of web sites; and
   means for clustering the plurality of web sites based on similarities between the traffic pattern for each web site and the traffic pattern for each other web site in the plurality of web sites.

29. The apparatus of claim 28, wherein the traffic pattern is a normalized weighted average request pattern.

30. The apparatus of claim 28, wherein the means for clustering the plurality of web sites into two or more clusters further includes means for shifting one or more of the traffic patterns for each of the web sites in the plurality of web sites to compensate for differences in time zones.

31. The apparatus of claim 28, wherein the means for profiling the two or more clusters includes:
   means for identifying, for each cluster, a traffic template that is most similar to traffic patterns of all of the member web sites of the cluster.

32. The apparatus of claim 31. wherein the traffic template that is most similar to traffic patterns of all of the member web sites of the cluster is identified by averaging the traffic patterns of all of the member web sites of the cluster.

33. The apparatus of claim 31, wherein the traffic template that is most similar to traffic patterns of all of the member web sites of the cluster is identified by minimizing a maximum difference between the traffic template and each traffic pattern of each member web site of the cluster.

34. The apparatus of claim 25, wherein the means for matching the traffic data to a matching traffic template of a plurality of predefined traffic templates includes:
   means for determining if the traffic data does not match any of the plurality of predefined traffic templates; and
   means for generating a new traffic template based on the traffic data if the traffic data does not match any of the plurality of predefined traffic templates.

35. The apparatus of claim 25, further comprising:
   means for performing at least one of traffic prediction, capacity planning and hot-spot detection based on the characterizing of the web site.

36. The apparatus of claim 26, further comprising:
   means for identifying characteristics of the member web sites of each cluster; and
   means for identifying characteristics of the cluster based on the characteristics of the member web sites of the cluster.

37. A method for determining characteristics of one or more web sites based on traffic data, comprising:
   receiving traffic data for a plurality of web sites;
   clustering, by a processor, the plurality of web sites into two or more clusters based on the traffic data, wherein clustering the plurality of the web sites further includes calculating a dissimilarity measure between each pair of web sites in the plurality of web sites, and clustering the plurality of web sites based on the dissimilarity measures for each pair of web sites;
   profiling, by the processor, the two or more clusters based on traffic data for member web sites of each cluster, to generate a traffic template for each cluster;
   identifying characteristics of the member web sites of each cluster; and
   identifying characteristics of the cluster based on the characteristics of the member web sites of the cluster.

38. A method for deploying computing infrastructure, comprising integrating computer readable code into a computing system, wherein the code in combination with the computing system is capable of performing the following:
   receiving traffic data for the web site;
   matching the traffic data to a matching traffic template of a plurality of predefined traffic templates;
   clustering, by a processor, the plurality of web sites into two or more clusters based on the traffic data, wherein clustering the plurality of the web sites further includes calculating a dissimilarity measure between each pair of web sites in the plurality of web sites, and clustering the plurality of web sites based on the dissimilarity measures for each pair of web sites; and
   characterizing the web site based on characteristics of the matching traffic template.

* * * * *